(12) United States Patent
Labrecque (10) Patent No.: US 8,717,560 B2
(45) Date of Patent: May 6, 2014

(54) RING GRATING SPECTROMETER

(75) Inventor: David Roger Labrecque, Orono, ME (US)

(73) Assignee: University of Maine System Board of Trustees, Bangor, ME (US)

( * ) Notice: Subject to any disclaimer, the term of this patent is extended or adjusted under 35 U.S.C. 154(b) by 436 days.

(21) Appl. No.: 13/100,495

(22) Filed: May 4, 2011

(65) Prior Publication Data

US 2011/0273707 A1 Nov. 10, 2011

Related U.S. Application Data

(60) Provisional application No. 61/331,049, filed on May 4, 2010.

(51) Int. Cl.
*G01J 3/40* (2006.01)
*G01J 3/18* (2006.01)
*G01J 3/28* (2006.01)
*G01J 3/02* (2006.01)

(52) U.S. Cl.
CPC .............. *G01J 3/18* (2013.01); *G01J 3/0243* (2013.01); *G01J 3/2823* (2013.01); *G01J 3/28* (2013.01); *G01J 3/2846* (2013.01)
USPC ............................ 356/305; 356/328; 356/334

(58) Field of Classification Search
USPC ......................................... 356/305, 328, 334
See application file for complete search history.

(56) References Cited

U.S. PATENT DOCUMENTS

| | | | |
|---|---|---|---|
| 5,371,813 A * | 12/1994 | Artigue | 385/24 |
| 5,731,874 A | 3/1998 | Maluf | |
| 6,667,830 B1 * | 12/2003 | Iketaki et al. | 359/368 |
| 6,958,469 B2 | 10/2005 | Ishizuka | |
| 7,463,349 B1 * | 12/2008 | Biellak et al. | 356/237.2 |
| 7,755,834 B2 | 7/2010 | Koyanagi et al. | |
| 2010/0039641 A1 | 2/2010 | Park et al. | |
| 2011/0024609 A1 * | 2/2011 | Park et al. | 250/237 |

OTHER PUBLICATIONS

David Labrecque, University of Maine Power point presentation: Computer-controled circular diffraction spectrometer, Mar. 9, 2011.
Jenkins and White, Fundamentals of Optics, "The Diffraction Grating", Chapter 17, pp. 355-374 (1976).
Keating et al., "Fresnel-Zone-Plate Spectrometer with Central Stop", J. Optical Soc. Am., 62(8):945-948 (1972).
Richardsons Diffraction Grating Habdbook, Sixth Edition, Chapter 7, Section 7.5.1., 18 pages (2005).

* cited by examiner

*Primary Examiner* — Gregory J Toatley
*Assistant Examiner* — Sunghee Y Gray
(74) *Attorney, Agent, or Firm* — Choate, Hall & Stewart, LLP; Brian E. Reese (57) ABSTRACT

The present invention provides apparatuses including a point light source, a diffraction grating oriented in a light path generated from the point light source wherein the diffraction grating diffracts and concentrates light from the point light source into one or more rings of light, a detector positioned to detect one or more of the rings of light or light transmitted from a sample exposed to said rings of light, and a computer operably connected to the detector to analyze the intensity of one or more of the rings of light or said light transmitted from said sample. Variations including samples and additional components and methods of making the apparatuses of the present invention are also disclosed.

15 Claims, 10 Drawing Sheets

RING GRATING SPECTROMETER

CROSS-REFERENCE TO RELATED APPLICATIONS

This application claims priority under 35 U.S.C. §119 to U.S. Provisional Application No. 61/331,049, filed May 4, 2010, which is herein incorporated by reference in its entirety.

TECHNICAL FIELD

The present invention generally relates to scientific instrumentation. More particularly, the present invention relates to novel spectrometers, including spectrofluorometers and others.

BACKGROUND OF THE INVENTION

Background Information

Spectrometers allow scientists to identify chemical compounds and their thermodynamic properties. Spectroscopy involves the separation of light into its different wavelengths. The word "light" is used here to mean all wavelengths of electromagnetic radiation including both visible and invisible regions. Matter and its properties can be identified by analyzing light radiated by matter, or by analyzing how light is absorbed, transmitted or scattered by matter. Spectrometers are used with telescopes to identify chemicals in stars. They are used with microscopes to analyze chemicals on a microscopic scale. They are used to safely and nondestructively identify chemicals. It is important that college and high school labs have spectrometers so that students can learn how to use this powerful tool and prepare themselves for careers in science.

In a conventional spectrometer, a diffraction grating is used to separate light into its various wavelengths. A reflection diffraction grating is a plate with a series of long narrow parallel mirrors. A transmission diffraction grating is a plate with a series of long narrow parallel slits. In Fraunhofer diffraction, the incident light approaches a grating as plane parallel waves, as if the light source was at an infinite distance to the grating. The angular separation of the wavelengths is a function of $n\lambda = d(\sin\theta_i + \sin\theta_d)$, where n is an integer, $\lambda$ is the wavelength, d is the separation distance between the lines on the diffraction grating, $\theta_i$ is the angle of incident light and $\theta_d$ is the angle of the diffracted light. For an example, see Maluf, U.S. Pat. No. 5,731,874. Most spectrometers are designed using Fresnel-type diffraction, where the light source is a point source and a linear grating with straight parallel lines concentrates light of one wavelength to a point or straight line image. A variation on this approach utilizes a cylindrically or spherically concave grating that concentrates monochromatic light to a straight line or point image. A Rowland circle approach is typically used to design these types of spectrometers. A Rowland circle of diameter R has a concave reflective grating with a radius of curvature of R placed on that circle. Rowland found that if a concave grating with equally spaced bands faces the center of the circle, a point source of light on the circle will be diffracted and concentrated to another point on the circle. See Jenkins and White, Fundamentals of Optics, 1976, p. 374.

A problem with using current spectrometer technology is that expensive and sensitive components are required in order to generate a measurable signal. Other problems include the need for sensitive detection equipment, the need for complex and expensive alignment equipment, and the need for time consuming alignment procedures in order to ensure current technology operates correctly.

SUMMARY OF THE INVENTION

The present invention provides, in a first aspect, an apparatus including a point light source, a diffraction grating oriented in a light path generated from the point light source wherein the diffraction grating diffracts and concentrates light from the point light source into one or more rings of light, a detector positioned to detect one or more of the rings of light or light transmitted from a sample exposed to said rings of light, and a computer operably connected to the detector to analyze the intensity of one or more of the rings of light or said light transmitted from said sample.

The present invention provides, in a second aspect, an apparatus including a point light source, a first diffraction grating oriented in a light path generated from the point light source wherein the first diffraction grating diffracts and concentrates light from the point light source into one or more rings of light, a light barrier configured to allow only a portion of light from the rings of light to penetrate the light barrier, a sample barrier that does not allow light to pass through that is disposed on the opposite side of a sample from the penetrating light, a filter comprising at least one opaque ring, wherein the filter is disposed in a light path emitted from the sample and is disposed off of a common axis and allows light emitted from the sample to substantially pass through, a second diffraction grating oriented in a light path emitted from the sample wherein the second diffraction grating diffracts light passing through the filter into one or more rings of emitted light, a detector positioned to detect one or more of the rings of emitted light, and a computer operably connected to the detector to analyze the intensity of one or more of the emitted rings of light.

The present invention provides, in a third aspect, a method of manufacturing an apparatus, the method comprising providing a point light source, providing a diffraction grating oriented in a light path from the point light source, positioning the diffraction grating such that the light from the point light source is diffracted into one or more rings of light, providing a detector, positioning the detector such that the detector may detect one or more of the rings of light or light transmitted from a sample exposed to the rings of light, and providing a computer, wherein the computer is operably connected to the detector and the computer analyzes the intensity of one or more of the rings of light.

These, and other objects, features and advantages of this invention will become apparent from the following detailed description of the various aspects of the invention taken in conjunction with the accompanying drawings.

BRIEF DESCRIPTION OF THE DRAWINGS

One or more aspects of the present invention are particularly pointed out and distinctly claimed at the conclusion of the specification. The foregoing and other objects, features, and advantages of the invention are apparent from the following detailed description taken in conjunction with the accompanying drawings in which:

DETAILED DESCRIPTION OF THE INVENTION

The present invention addresses many of the issues with current spectrometer technology and provides additional benefits as well. Aspects of the present invention accomplish this by using light-ring diffraction gratings that do not concentrate light to a point or straight line, but rather focus light into rings. Aspects of the invention also provide benefits by using an array detector to capture light from the entire ring and using a computer to analyze the intensity and other aspects of one or more rings of light. By doing so, less intense light sources are required and alignment equipment and procedures become unnecessary due to the analytical field of the detector.

In a first aspect, the present invention provides an apparatus including a point light source, a diffraction grating oriented in a light path generated from the point light source wherein the diffraction grating diffracts and concentrates light from the point light source into one or more rings of light, a detector positioned to detect one or more of the rings of light or light transmitted from a sample exposed to said rings of light, and a computer operably connected to the detector to analyze the intensity of one or more of the rings of light or said light transmitted from said sample.

The point light source may take several forms including a true point light source, such as a single light emitting diode (LED), or a constructive point light source, such as when a non-point light source is transmitted through an aperture, such as light directed through a fiber optic cable, effectively creating a point light source. Non-limiting examples of suitable point light sources for use within the scope of the present invention include: light emitting diodes; incandescent light sources, including light bulbs; photoluminescent sources, including chemiluminescent sources; and other sources of light capable of becoming true or constructive point light sources.

The diffraction grating may take a variety of forms within the scope of the invention as long as one or more rings of light result from the diffraction grating. Non-limiting exemplary embodiments of diffraction gratings contemplated as within the scope of the invention include flat diffraction gratings, concave diffraction gratings, convex diffraction gratings, and diffraction gratings with variably spaced bands. In addition, the diffraction grating may be a reflection diffraction grating or a transmission diffraction grating. Aspects of the invention incorporating concave diffraction gratings or diffraction gratings including variably spaced bands are discussed in more detail below.

The detector may be any detector that is appropriate for a specific application of the present invention. Several aspects of the invention include a two-dimensional array detector, such as those in a video camera or a still camera. Detectors contemplated as within the scope of the invention may include detectors having movable optics. According to some aspects of the present invention, a two-dimensional array camera detector sends an image of diffracted light-rings to a computer where it is analyzed and converted to a spectral graph of intensity versus wavelength. A subsequent analysis may involve integrating the intensity values around each monochromatic ring in the spectrum, i.e., from 0 to 360 degrees. This integration may be repeated for various monochromatic rings until the desired spectral graph is plotted. For example, absorbance, transmittance or other parameters can be calculated from the intensity values and plotted versus wavelength, wavenumber or frequency, depending upon the experimental or other application for which an aspect of the present invention is used.

Any computer, processor, or computer- or processor-containing device capable of analyzing data from the detector is contemplated as within the scope of the present invention. Non-limiting examples of suitable computers include devices incorporating one or more integrated circuits such as desktop computers, laptop computers, tablet computers, smartphones, and others, or devices incorporating one or more discrete circuits. The computer may be connected to the detector in a variety of ways including wired or wireless configurations, so long as data is communicated form the detector to the computer. According to certain embodiments, data may also be communicated from the computer to the detector. An example of computer to detector communication may be when the computer is connected to a detector in the form of a camera with movable optics and the computer is searching for light of a particular wavelength. In some circumstances, the computer may direct the detector to alter the focusing plane in order to allow analysis of the desired wavelength of light.

Figure 1:
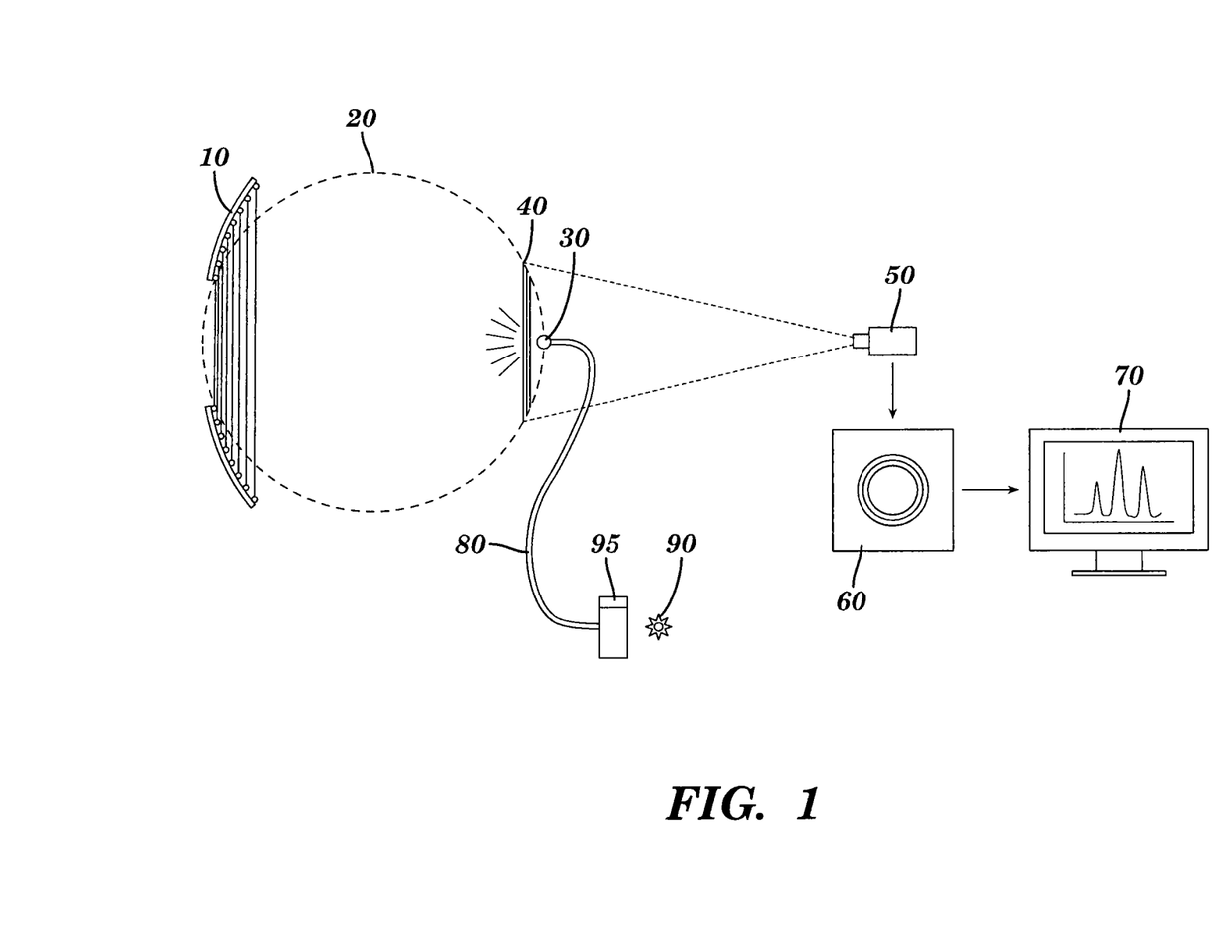
FIG. 1 illustrates one embodiment of an apparatus in accordance with an aspect of the present invention.

FIG. 1 shows an embodiment of a light-ring diffraction grating spectrometer within the scope of the present invention. Light from a fiber optic point source 30 is separated into light-rings of different wavelengths 40 by the diffraction grating 10. A detector, for example, a digital camera, 50, collects an image of these rings 60 which is sent to a computer 70. In several embodiments, the computer sums the light intensity around the rings and produces intensity versus radius data. A calibration equation for the given spectrometer may then be applied to this data to produce intensity versus wavelength spectra. Also shown in FIG. 1 is a sample 95 that is exposed to light 90 prior to the light's entry into the fiber optic cable 80. In this embodiment of the present invention, the point light source 30 did not necessarily originate as a point light source, as discussed above.

Figure 2A:
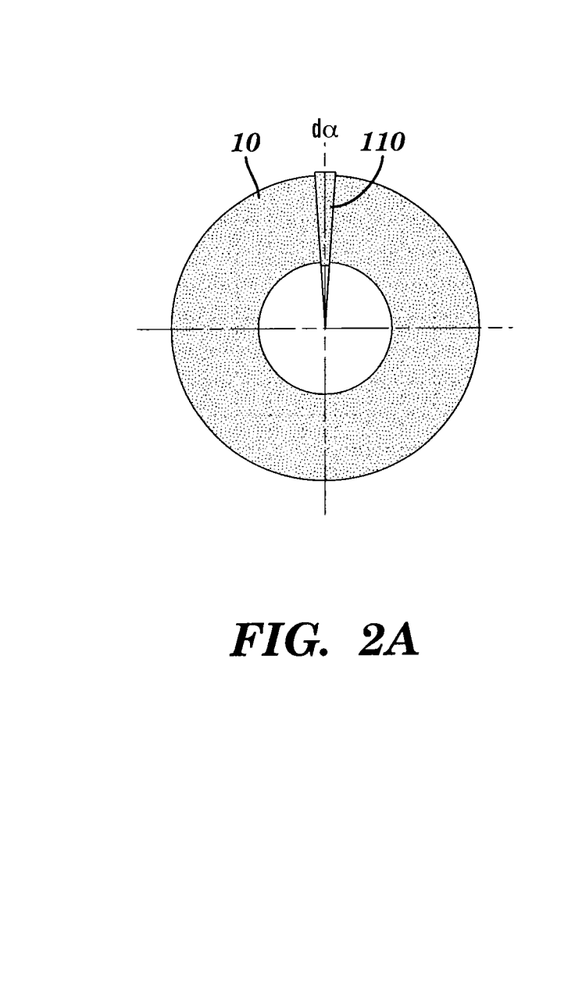
FIG. 2A depicts a conceptual diagram illustrating one aspect of the invention.
Figure 2B:
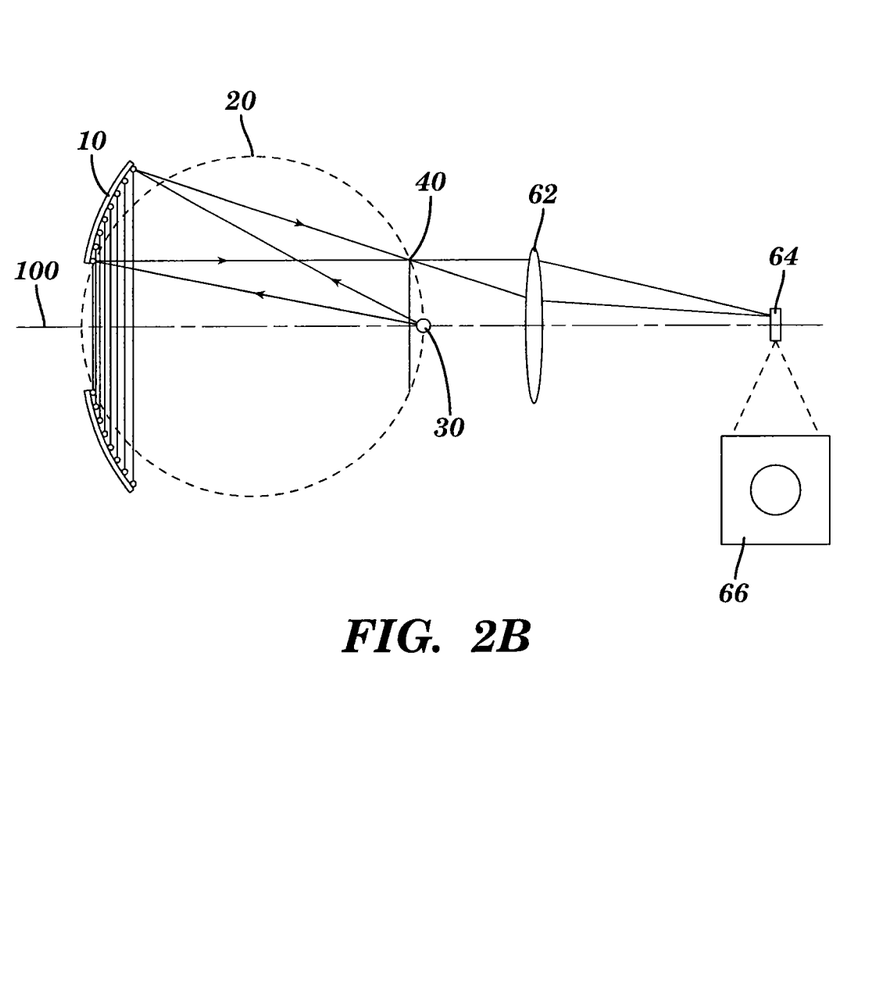
FIG. 2B shows another embodiment of an apparatus in accordance with an aspect of the present invention.

FIG. 2B shows a simple ray diagram for light-ring diffraction grating spectrometers within the scope of the present invention. The direction of light rays from a monochromatic point light source 30, disposed on a common axis 100, diffracted by one small triangular element, dα, of the grating 110 is shown. A Rowland circle method is used to calculate the position of the focused diffraction pattern 40. The contribution of all of these small triangles forms one monochromatic ring of light 40 on the surface of the Rowland circle 20. A lens 62 is used to focus light from this ring onto a 2D array detector 64. FIG. 2A shows a front view of the general shape of the diffraction grating 10 in order to clearly show the triangular element dα 110, while FIG. 2B shows a profile view of the diffraction grating 10 in the context of an embodiment of the present invention. FIG. 2A does not show an accurate frontal view of diffraction grating 10, merely a general concept to show triangular dα 110. Though not shown, embodiments of the present invention according to FIG. 2 may also include analysis of a sample. Appropriate samples and configurations thereof may be as described elsewhere in this disclosure, or in any other application-appropriate manner.

Figure 3:
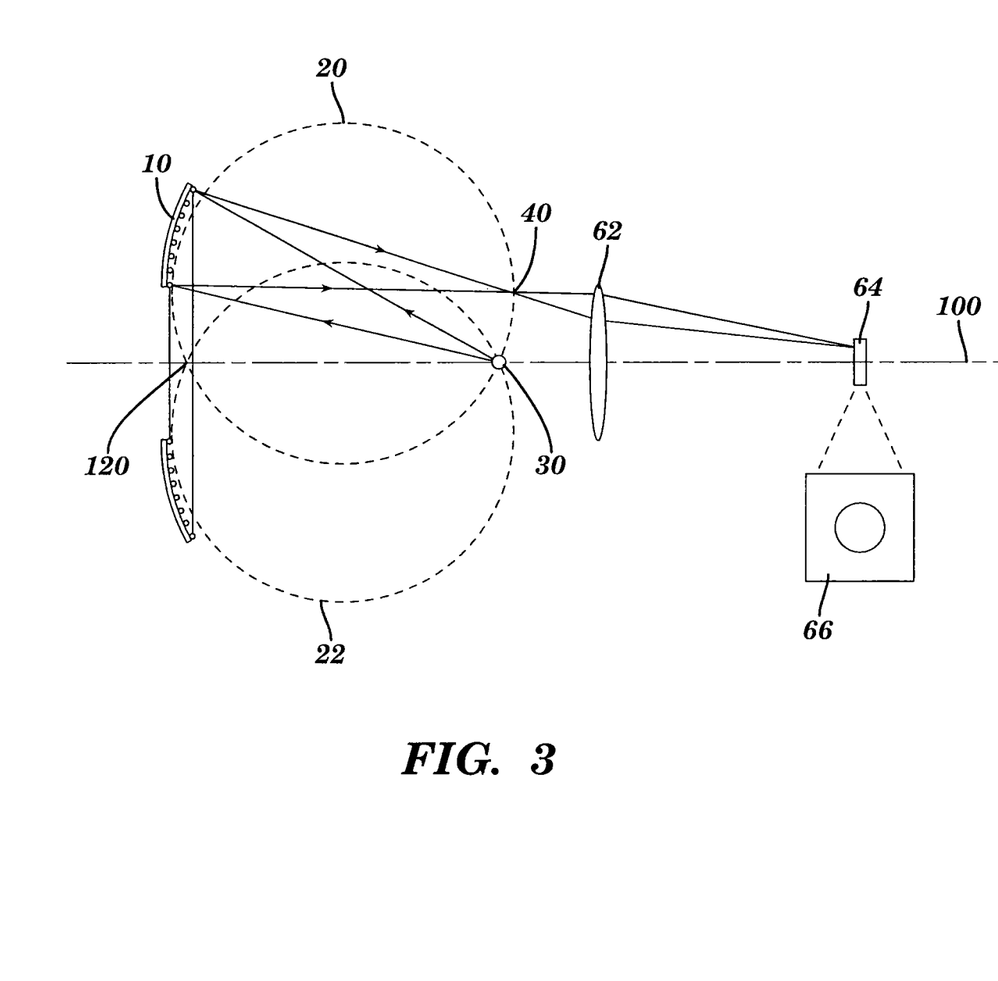
FIG. 3 shows another embodiment of an apparatus in accordance with an aspect of the present invention.

FIG. 3 shows an alternate embodiment of aspects of the present invention wherein the small triangular grating elements shown as 110 in FIG. 2A, do not share the same Rowland circles 20 and 22. The Rowland circles 20 and 22 intersect the point light source 30 and another point 120 on the common axis 100. In many embodiments of the present invention, the small triangular grating elements may also be curved and directed to the center of the circle according to the Rowland method. This approach can be used to design spectrometers with better resolution and signal to noise parameters within the scope of the present invention. Though not shown, embodiments of the present invention according to FIG. 3 may also include analysis of a sample. Appropriate samples and configurations thereof may be as described elsewhere in this disclosure, or in any other application-appropriate manner.

In a second aspect, the present invention provides an apparatus including a point light source, a first diffraction grating oriented in a light path generated from the point light source wherein the first diffraction grating diffracts and concentrates light from the point light source into one or more rings of light, a light barrier configured to allow only a portion of light from the rings of light to penetrate the light barrier, a sample barrier that does not allow light to pass through that is disposed on the opposite side of a sample from the penetrating light, a filter comprising at least one opaque ring, wherein the filter is disposed in a light path emitted from the sample and is disposed off of a common axis and allows light emitted from the sample to substantially pass through, a second diffraction grating oriented in a light path emitted from the sample wherein the second diffraction grating diffracts light passing through the filter into one or more rings of emitted light, a detector positioned to detect one or more of the rings of emitted light, and a computer operably connected to the detector to analyze the intensity of one or more of the emitted rings of light.

Figure 4:
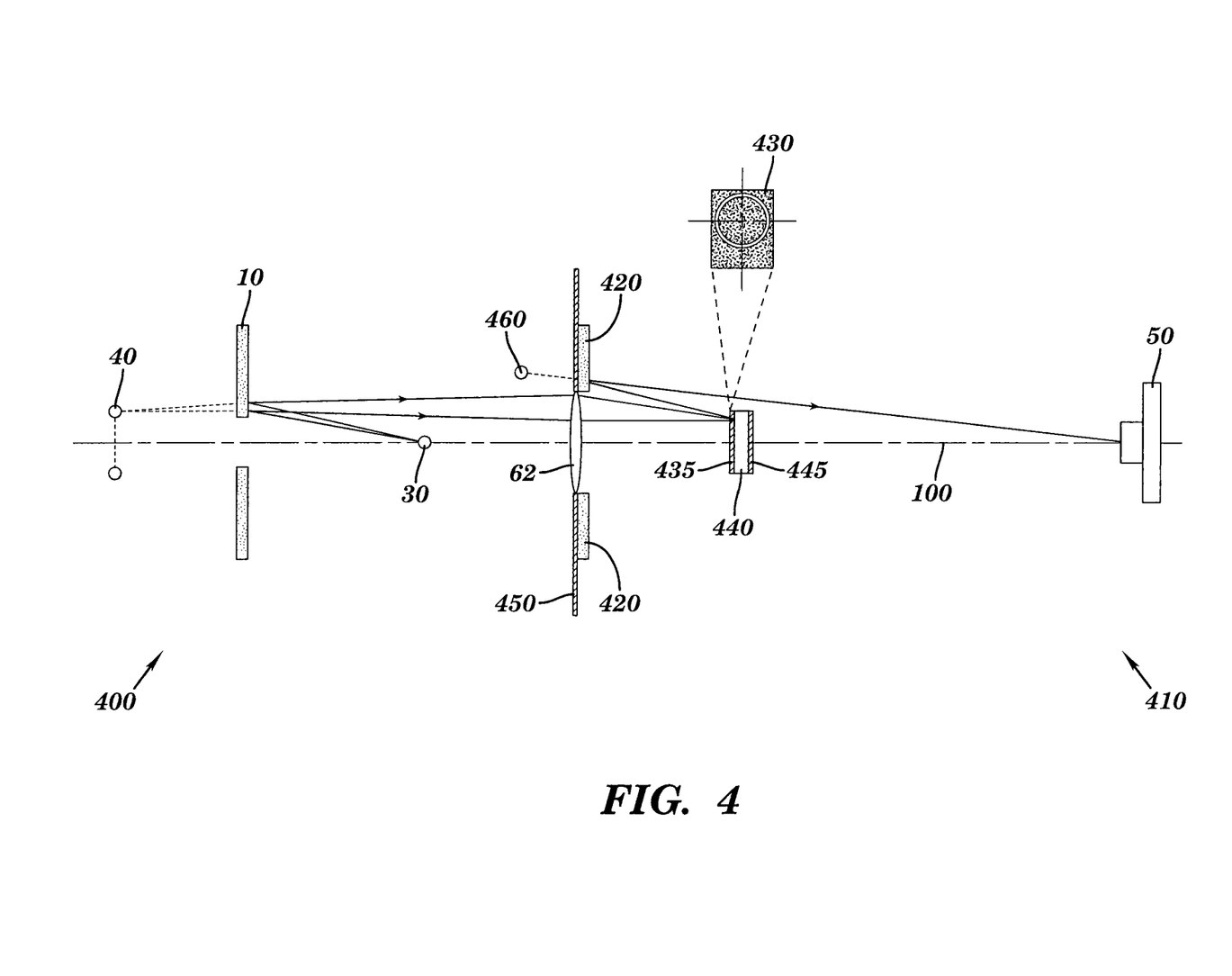
FIG. 4 shows another embodiment of an apparatus in accordance with an aspect of the present invention.

FIG. 4 provides an exemplary embodiment of this aspect of the invention, in this embodiment, combining an excitation light-ring spectrometer 400, an emission light-ring spectrometer 410 and an offset circular filter 430 to illustrate the fundamental components of a light-ring spectrofluorometer within the scope of this aspect of the present invention. The excitation spectrometer on the left 400 includes a point light source 30 and a first diffraction grating 10 as described above. A portion of the light transmitted by the first diffraction grating 10 passes through an aperture in a light barrier 450 and, in certain embodiments, a lens 62, to create a spectral ring image on the sample 440. Sample barrier 445 prevents the light transmitted to the sample 440 from reaching the detector 50. In the embodiment shown in FIG. 4, an offset circular filter 430 selects the wavelengths that excite the sample as a function of the angle around the common axis 100. Light is then emitted from the sample and transmitted by the second diffraction grating 420. Emission spectra as a function of wavelength are collected by a detector 50. A computer (not shown) then analyzes the data provided by the detector 50.

The point light source, first diffraction grating, second diffraction grating, detector and computer may vary as described elsewhere in this disclosure and such variations are contemplated as within the scope of the invention.

The light barrier 450 may take any application-appropriate form, so long as undesired light is prevented from passing through the barrier. For certain applications of the present invention, certain portions of the light barrier may be cut out or otherwise modified to allow for the introduction of additional components, such as a lens, or for a hole in the barrier to be present. For example, if an aspect of the present invention is being used as a spectrofluorometer, the light barrier may be used to block out undesired direct, reflected and scattered light from the point light source. It may also block second and higher order diffraction rings.

Aspects of the present invention may be used for several purposes and many of these may include analysis of a sample 440 (also shown as 95 in FIG. 1). Such a sample may include any substance that has a specific reaction to at least one wavelength of light and so may give information about it including concentration, composition or other characteristics or parameters, upon exposure to light of a particular wavelength or wavelengths. Specific examples include biological or chemical material including: deoxyribonucleic acid (DNA), ribonucleic acid (RNA), chlorophyll, oil, residue from explosives, contaminants in water sources or supplies, or a variety of other samples.

The sample 440 may be positioned in any application-appropriate manner, including between a light source and a fiber optic cable as shown in FIG. 1, or between a point light source and a diffraction grating. Depending upon the specific application for which the present invention is being used, additional configurations are also possible and the examples presented here should not be construed as limiting. Such alternate configurations are all contemplated as within the scope of the present invention.

A sample barrier 445 may be used to block light being used to excite a sample from completely penetrating the sample and proceeding to be detected by the detector in certain embodiments. In aspects of the invention where this is applicable, the sample barrier may be configured so as to block all light from the detector that is not emitted from the sample as a result of being exposed to the excitation light.

A filter 430 may be included in aspects of the invention and the filter may include one or more opaque rings. As used for the filter, the one or more opaque rings may be rings present on an otherwise transparent substrate, may be rings present on a non-opaque substrate that is not transparent, or may be created by cutting a portion out of an opaque material to allow some light to penetrate while blocking other light of a particular wavelength or wavelengths. The portion removed from an opaque material may be a ring shaped portion according to certain aspects of the invention.

In a third aspect, the present invention provides a method of manufacturing an apparatus, the method comprising providing a point light source, providing a diffraction grating oriented in a light path from the point light source, positioning the diffraction grating such that the light from the point light source is diffracted into one or more rings of light, providing a detector, positioning the detector such that the detector may detect one or more of the rings of light or light transmitted from a sample exposed to the rings of light, and providing a computer, wherein the computer is operably connected to the detector and the computer analyzes the intensity of one or more of the rings of light.

Each of the components, including: the point light source, diffraction grating, detector, computer and sample may include the variations discussed elsewhere in this disclosure.

The specific orientation of the diffraction grating may vary according to a specific point light source and application for which aspects of the present invention are to be used. Examples of acceptable orientations contemplated as within the scope of the invention are found in the figures, examples, and other material in this disclosure. The diffraction grating may be physically attached to other components of the present invention or may be physically separate components.

EXAMPLES

Curved Diffraction Grating

In the following example, an embodiment of the present invention including a curved ring diffraction grating is described. The spectrometer shown in FIG. 1 has a curved ring diffraction grating 10 that diffracts and concentrates light from a point light source 30 into rings 40 of monochromatic light. A Rowland's circle 20 is used here to optimize the design. A camera 50 focused on the ring image detects and digitizes that image 60 which is then converted by a computer 70 into an intensity versus wavelength spectrum.

In this example, the point light source 30 is the end of a fiber optic cable 80 with the light to be analyzed 90 going into the other end of the fiber optic. The light to be analyzed 90 may be transmitted through a chemical sample 95 as shown in FIG. 1.

The light-ring diffraction grating 10 shown in FIG. 1 has a radius of curvature equal to the diameter of the Rowland's circle 20. This configuration diffracts and concentrates light from the point source into rings of light 40 resulting in a ring spectrum. The Rowland circle approach is used here to calculate the position and curved shape of the light-ring diffraction grating 10.

To better describe how the ring image is formed in this example, divide the light-ring grating into narrow triangular elements 110 with the angle at the grating center equal to a small angle da as shown in FIG. 2A. The Rowland circle approach may then be used to calculate the position of the diffraction grating segment 110 and its curvature, and the position of the point light source 30 and the resulting diffraction pattern. Light rays travel from the point light source 30 to the diffraction grating segment 110 and then to a point on the Rowland circle 20. The ring image is formed by adding up the contribution from each point made by all of the dα triangular elements that make up the diffraction grating 10. The point light source 30, the center of the light-ring grating 10 and the detection device 50 may all be located on a common axis 100 as shown in FIG. 2B.

Figure 5:
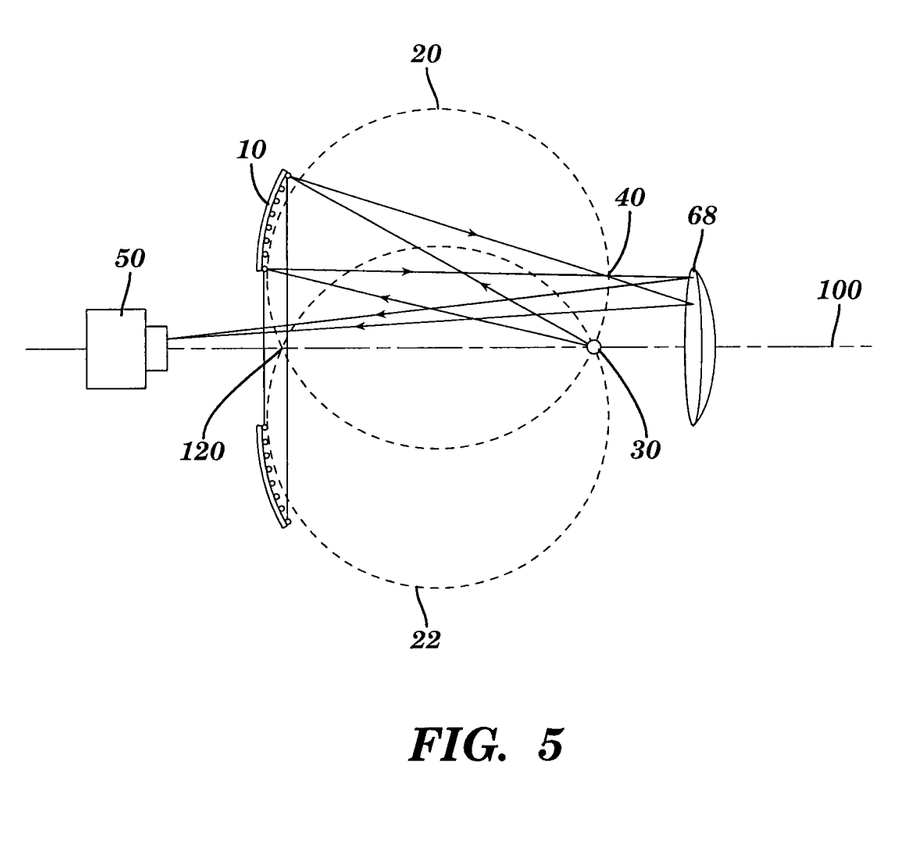
FIG. 5 shows another embodiment of an apparatus in accordance with an aspect of the present invention.

The ring image 40 on a portion of the Rowland circle 20 serves as the real light object for the detection system. The lens 62 shown in FIG. 2B bends the light rays from the ring to form a real image of the ring 40 on the detector array 64. The detector optics could also utilize reflective optics like a curved mirror 68, as is shown in FIG. 5, focusing the image back along the common axis 100 through the hole in the light-ring diffraction grating 10 where the detector array 50 would be located. This may have the advantages of reducing chromatic aberration and reducing the size of the spectrometer. Though not shown in FIG. 5, embodiments of the present invention according to FIG. 5 may also include analysis of a sample. Appropriate samples and configurations thereof may be as described elsewhere in this disclosure, or in any other application-appropriate manner.

The distance from the rings of varying wavelength to the camera lens varies slightly due to the curvature of Rowland's circle 20. See FIG. 1. This variation can reduce spectral resolution. For high resolution applications the camera's optics may be controlled by software to focus in on the desired ring.

A different embodiment of the present invention is shown in FIG. 3 where each narrow triangular element (shown as 110 in FIG. 2A) does not share the same Rowland circle 20 and 22. The only requirement needed to form focused rings is that each circle share a common point where the point light source 30 is located and a common point on the common axis 100. This approach may have several advantages. First, the spectrometer designer has more freedom to optimize the resolution and signal-to-noise characteristics of the spectrometer. Second, if desired, a flatter light-ring diffraction grating 10 can be used allowing the spectrometer to be longer and achieve higher resolution. The ring image 40 can be located on the Rowland circles 20 where the distance from the ring images to the detection system 50 remains more constant. Note that the design shown in FIG. 1 is a specialized version of that shown in FIG. 3 where all the Rowland circles for each small angle segment overlap, forming one circle.

Flat Diffraction Grating with Variably Spaced Bands

Figure 6A:
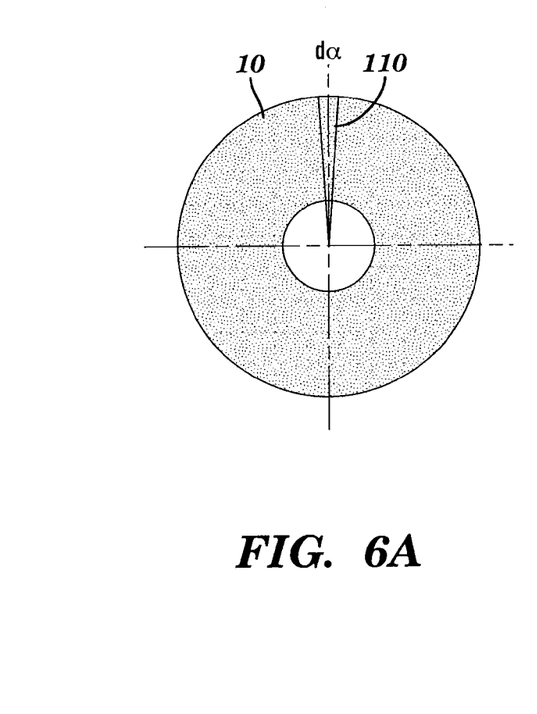
FIG. 6A depicts a conceptual diagram illustrating one aspect of the invention.
Figure 6B:
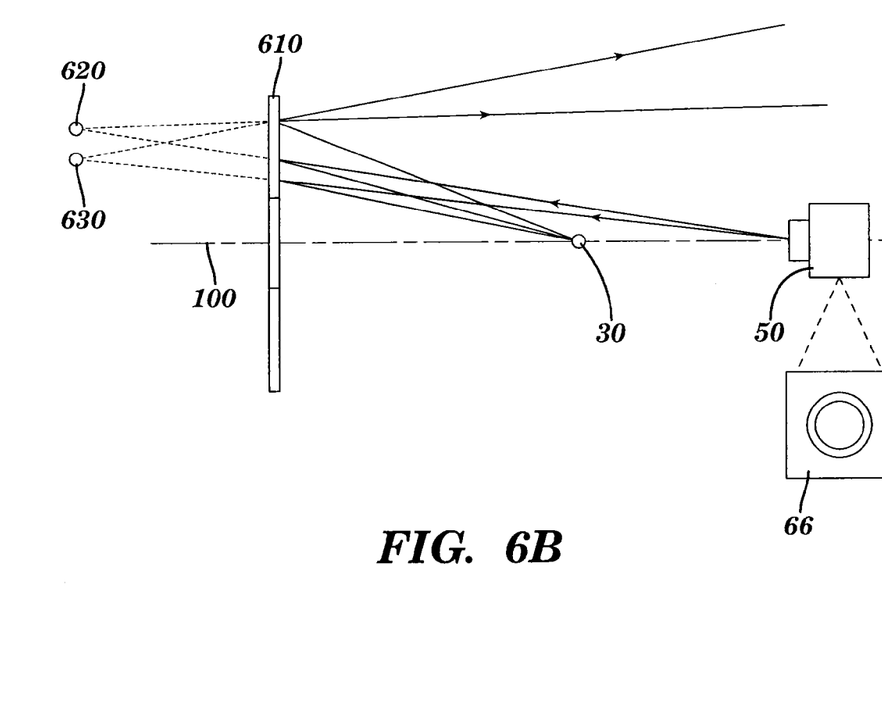
FIG. 6B shows another embodiment of an apparatus in accordance with an aspect of the present invention.

In the following example, another embodiment of a light-ring diffraction spectrometer as shown in FIG. 6B includes a flat light-ring diffraction grating 610 with variably spaced bands. FIG. 6B also shows how virtual ring images are created on the opposite side of the point light source 30. These virtual images serve as light objects for the detector 50. In this example, a point light source 30 projects light to a flat ring diffraction grating 610 where the light is diffracted into multiple rings of monochromatic light. For the sake of clarity of this example, only two points are shown, with 620 being a point on a ring of red light and 630 being a point on a ring of blue light. While some of the light is diffracted into the detector 50, in this example, it is virtual light rings, partially illustrated by points 620 and 630, which are detected by the detector 50 and used as the signal to be analyzed by the computer (not shown). Though not shown, embodiments of the present invention according to FIG. 6B may also include analysis of a sample. Appropriate samples and configurations thereof may be as described elsewhere in this disclosure, or in any other application-appropriate manner.

It will be appreciated that only points 620 and 630 are shown in FIG. 6B to more clearly illustrate the concept; these points correspond to a portion of the light that would interact with triangular portion 110 of the diffraction grating 610 shown in FIG. 6A. However, as with the examples using a concave diffraction grating 10 above, the principle would apply in three dimensions to provide rings of light, not merely points of light.

In order to calculate the proper spacing for the variably spaced bands, a computer ray tracing program may use a grating equation, $n\lambda = d(\sin\theta_i + \sin\theta_d)$, to calculate the diffracted rays from the point light source 30 along various points on the diffraction grating 610 surface. Here, n is an integer representing the diffraction order, $\lambda$ is the wavelength, d is the ring band spacing, $\theta_i$ is the incident light angle and $\theta_d$ is the diffracted light angle.

Figure 7:
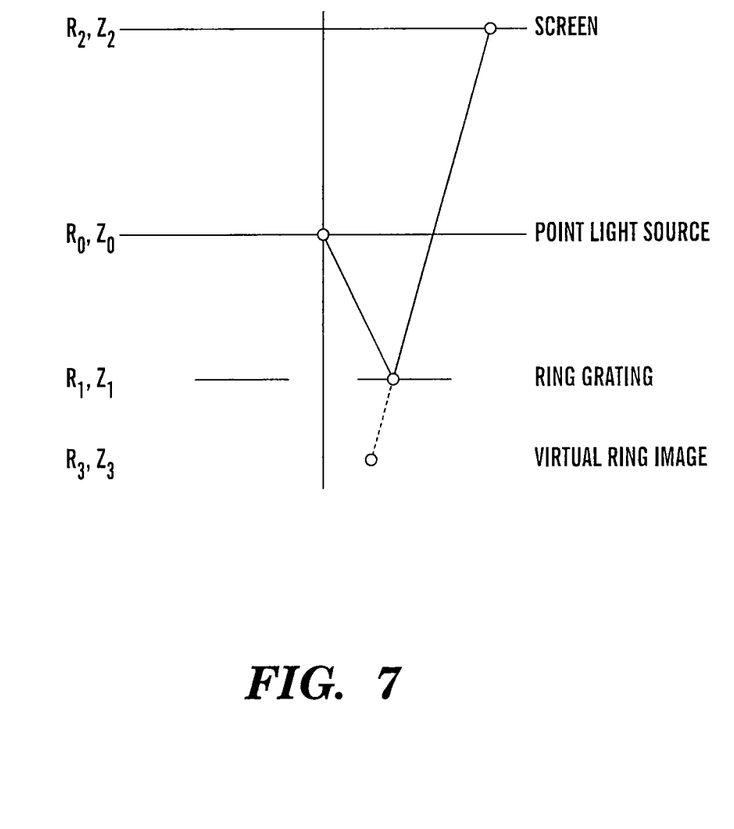
FIG. 7 shows the cylindrical coordinates of one light ray from a point light source of light and its diffracted ray.

To calculate the variable line spacing of the flat light-ring diffraction grating 410, we solve for one slice of the ring 110, dα, as shown in FIG. 6A and FIG. 7. Using cylindrical coordinates and the grating equation, we have the following equations for the incident, $\theta_i$, and diffracted angle, $\theta_d$. This gives the radial position, $R_2$, of the ray on a flat screen which is set at a height of $Z_2$ as shown in FIG. 7.

$$\theta_i = \text{atn}((R_1 - R_0)/Z_1)$$

$$\theta_d = -a\sin(n\lambda/d - \sin\theta_i) = -a\sin(n\lambda/d - \sin(\text{atn}((R_1-R_0)/Z_1))) \quad \text{(Equation 1)}$$

$$R_2 = (Z_2 - Z_1)\tan(\theta_d) + R_1 \quad \text{(Equation 2)}$$

In this example, the light ray is extended backward to define the virtual ring image as shown in FIG. 6B and FIG. 7. As another exemplary calculation, another similar ray labeled with prime components and one common point on the ring image where $R_3' = R_3$ and $Z_3' = Z_3$ is determined. The two rays have the following constant components: $R_0$, $R_1$, $Z_0$, $Z_1$, $Z_2$, $Z_0'$, $Z_1'$, $Z_2'$ and are set according to the desired spectrometer configuration. In the case of a virtual ring image in this example, the two lines intersect at $R_3$, $Z_3$ and are defined by $(R_1, Z_1)$, $(R_2, Z_2)$ and $(R_1', Z_1')$, $(R_2', Z_2')$. Since $Z_3' = Z_3$, $m'R_3 + b' = m R_3 + b$. Solving for $R_3$ gives: $R_3 = (b-b')/(m'-m)$. The following linear relationships may be used to determine $R_3$ as a function of the diffraction line spacing along $R_1'$.

$$m = (Z_2 - Z_1)/(R_2 - R_1) \text{ and } m' = (Z_2' - Z_1')/(R_2' - R_1')$$

$$b = Z_2 - mR_2 \text{ and } b' = Z_2' - m'R_2'$$

$$Z_2 = Z_2' \text{ and } Z_1 = Z_1'$$

$$R_3 = (Z_2 - Z_2' + m'R_2' - mR_2)/(m' - m) = (R_2R_1' - R_2'R_1)/(R_2 - R_2' + R_1' - R_1)$$

$$R_3 = (R_1'\tan(\theta_d) - R_1\tan(\theta_d'))/(\tan(\theta_d) - \tan(\theta_d'))$$

$$Z_3 = (Z_2 - Z_1)(R_3 - R_2)/(R_2 - R_1) + Z_2 \quad \text{(Equation 3)}$$

The diffraction line spacing, d, along the radius, $R_1'$, of the light-ring diffraction grating can be determined for a given $R_3$ by using equation 1 and equation 3. The spectrometer designer may use numerical or other computational techniques to solve for the diffraction grating line spacing, d, as a function of radius, $R_1'$, to meet the desired spectrometer specifications. A computer program was used to numerically calculate the grating band spacing for the exemplary embodiments shown in FIG. 6B and FIG. 8. FIG. 9 shows the band spacing as a function of radius for this spectrometer at 500 nm. Specifically, FIG. 9 shows a graph having the band spacing on the y axis and the radius of the diffraction grating as the x axis which may be of use in some aspects of the present invention. These equations are the general building block for creating both real and virtual ring images with both reflection and transmission gratings. A light-ring spectrometer is designed by applying these equations at various wavelengths to form the desired light-ring images at the desired locations where the camera detector can view them. Like the curved light-ring gratings, the light-ring locations will vary both in the R and Z dimensions. A computer program may calculate the optimum band spacing for a desired wavelength or wavelength range. Note that a traditional diffractive Fresnel-lens grating is a very specific application of these equations, where either R2 would be set to 0 for a real point image or R3 would be set to 0 for a virtual point image.

As a further example, a ring spectrofluorometer demonstrates many of the features of light-ring spectrometers described elsewhere in this disclosure. FIG. 4 shows a spectrofluorometer with an excitation spectrometer stage 400 on the left and an emission spectrometer stage 410 on the right. Light from a point light source 30 is used to create a virtual light-ring image 40 on the left of the first light-ring diffraction grating 10. The diffracted light rays are directed into a lens 62 which creates a real spectral ring image on a sample 440 held between one transparent plate 435 positioned between the lens 62 and the sample 440 and a sample barrier 445 positioned between the sample 440 and the detector 50.

A filter, in this example a circular slit filter 430, is disposed off of the common axis 100. The filter is used to refine the light that hits the sample so that the excitation light wavelength hitting the sample is a function of angle around the common axis 100. The fluorescence emitted from the sample 440 is diffracted by the second diffraction grating 420, creating a virtual image of a light-ring spectrum 460. The detector 50 collects this image and sends it to a computer (not shown) where it is processed. It will be appreciated that the fluorescent points of light around the circular slit 430 are not on the common axis in this case. In this example, the detector 50 is positioned on the common axis 100 where it sees a linear emission spectrum extending radially outward from the center. Collectively, all of these linear spectra create a complex virtual light-ring image containing three dimensions of data as seen by the detector 50. For clarity, a single point 460 on this virtual ring, is shown. The emission ring image contains three dimensions of data: light intensity, fluorescence emission and excitation wavelength. One significant advantage of this aspect of the invention is that it is a static spectrofluorometer with no moving parts, something unattainable with prior art methods and equipment.

Figure 8:
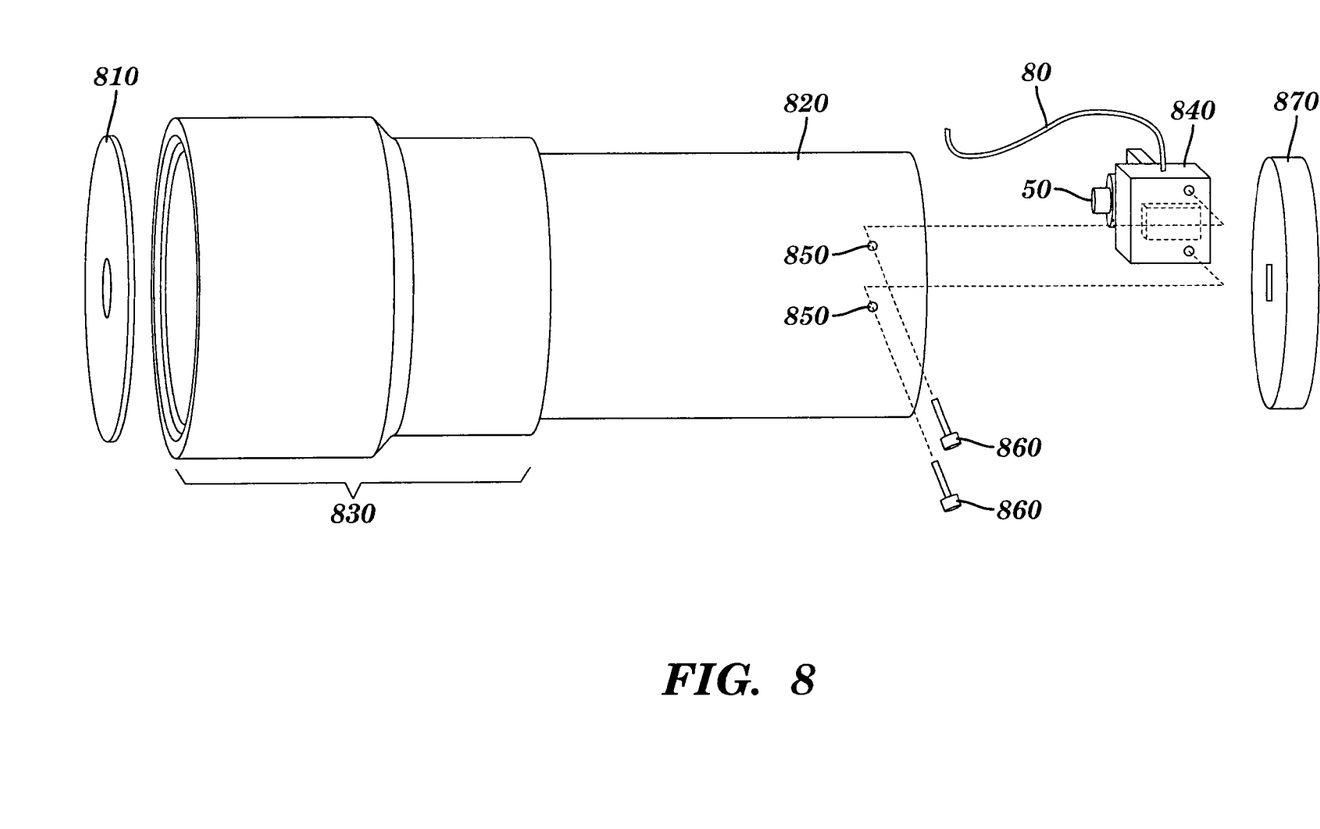
FIG. 8 shows an embodiment of an apparatus in accordance with an aspect of the present invention that is suitable for educational use.
Figure 9:
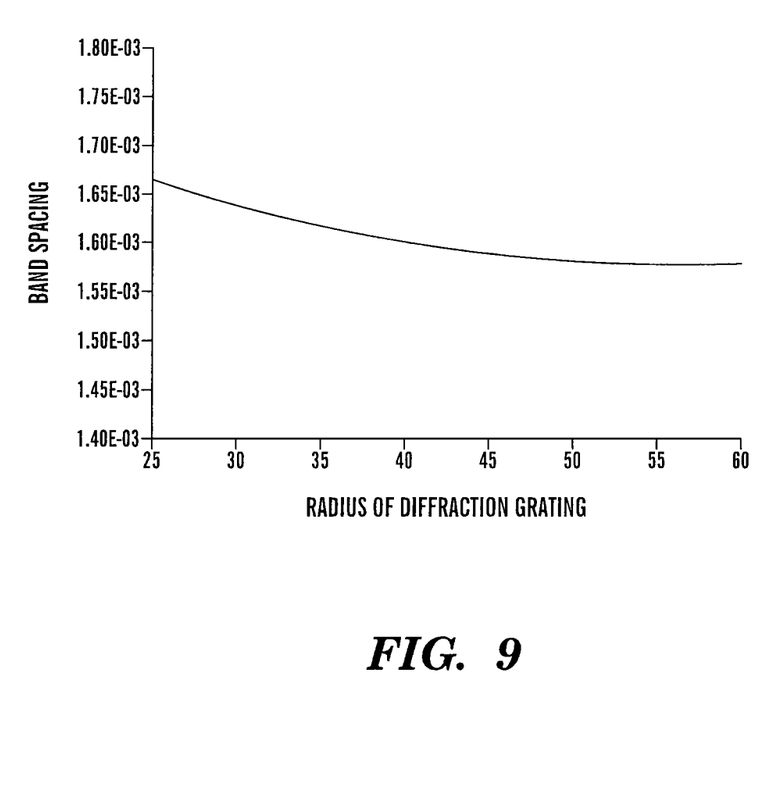
FIG. 9 is a graph showing an exemplary calculated ideal band spacing for an embodiment of an apparatus in accordance with an aspect of the present invention with the following design conditions: 500 nm light, $R_0=0$, $Z_0=0$, $R_1=40$ mm, $Z_1=-150$ mm.

FIG. 8 shows an exploded view of an exemplary embodiment of a student grade educational spectrometer within the scope of the present invention. The spectrometer includes a diffraction grating made from a CD 810, 3" schedule 40 PVC pipe 820 and 3"×4" coupling 830. The coupling 830 is grooved at one end to a 120 mm diameter with a routing tool so that a 120 mm CD grating will fit into the groove. The point light source, here a fiber optic point light source, 80, and a detector, here in the form of a board camera, 50, are mounted on a block 840 made of plastic or aluminum bar stock. The 1.5"×0.75" mount block 840 is also machined to hold a standard cuvette (not shown). The LED light source opposite from the fiber optic is also not shown. Two holes 850 are drilled and tapped into the mount block 840 so that it can be mounted to the PVC pipe 820 with screws 860. A simple fiber optic alignment mechanism, not shown, is also attached to these screws 860. The end of the fiber optic is glued to the mount 840. The length of the spectrometer and mount positions depends on the light-ring diffraction grating band spacing and the desired wavelength detection range. The CD grating shown here has a band spacing of 1600 nm. The distance from the diffraction grating to the fiber optic point light source is 20 cm and from the diffraction grating to the camera is 30 cm. A cap 870 is placed over the PVC pipe 820 and the mount block 840.

Figure 10:
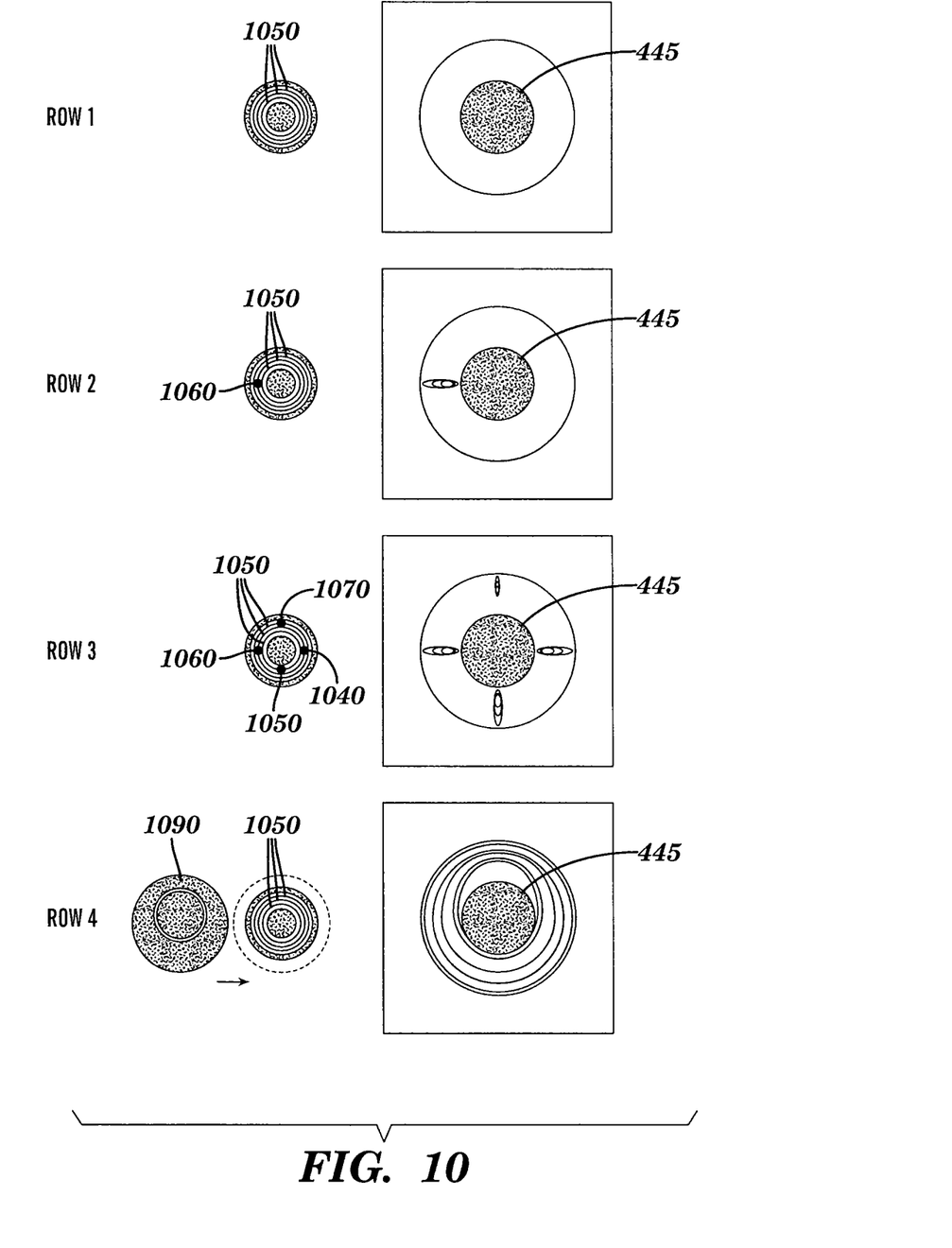
FIG. 10 depicts alternate views of the faces of samples in the left column, and detector views of diffraction gratings in the right column, of aspects of the present invention.

FIG. 10 illustrates what the face of a sample may look like according to certain spectrofluorometer embodiments of the invention, and what the corresponding image created from that sample face may look like to a detector used in that embodiment. The face of a particular embodiment and sample configuration is shown in the left column, and the view as seen from the detector 50 is shown in the right column. For clarity, an exemplary embodiment corresponding to that shown in FIG. 4 will be used to illustrate particular components, when necessary, with the caveat that these principles and manifestations are not limited to such an embodiment.

The right column in FIG. 10 shows four views of the second diffraction grating 420 as viewed from the detector 50.

FIG. 10 shows a small crystal sample 1060 placed in the light ring spectrum in the position of a desired excitation wavelength in the left column of row 2 of FIG. 10. The fluorescence from this small crystal sample acts as the point light source for the emission spectrometer on the right (shown as 410 in FIG. 4). The resulting linear spectrum is shown in row 2 on the right in FIG. 10. Row 3 shows the linear spectra that result from placing 4 crystals (1040, 1050, 1060, 1070) on the sample holder at different excitation wavelength positions. Row 4 shows a sample holder coated with a fluorescent sample and with an offset circular slit 1090 placed over the sample. The continuous 3D emission ring spectra is shown on the right and has 3 dimensions of data in excitation, emission and intensity.

Also shown in FIG. 10, the sample barrier 445 in the middle blocks the excitation light from reaching the detector 50. The left column shows the front of a sample holder where the sample is placed. The light-ring spectrum projected onto the sample holder by the first light-ring diffraction grating 10 is shown with contour lines 1050. Each contour represents 100 nm, so that a range of 300 nm to 700 nm is shown on the sample holder.

For some applications of the present invention, it may be desirable to use a detector, such as a camera, that is mounted off of the common axis. In the case of the spectrofluorometer example above, off-centered light points produce off-centered rings of light for each excitation wavelength and, as such, are suitable for detection by a camera mounted off of the common axis 100. Using detectors positioned either on the common axis or off the common axis are contemplated as within the scope of the present invention. The use of multiple detectors is also contemplated as within the scope of the present invention in certain embodiments.

As used herein "ring" or "rings" refer to shapes including circles, ellipses, or any curved closed shape.

For the purposes of this disclosure, the term "real image" means a point in space where real light is concentrated to form a resolved image, such as that of a ring. The light ring could be observed on a white screen placed at the relevant point in space.

For the purposes of this disclosure, the term "virtual image" means a point in space where an image appears, but at which no real light is actually present at that point in space.

While several examples are described in this disclosure, variations on these designs can be made depending on the application. To make the spectrometer easier to build, a low-cost camera with a fixed focus and sufficient depth of field can be used as the detector. Also, a variable focus detector could also be used to increase resolution since the light-ring image distance will vary slightly with wavelength. Another variation that is contemplated as within the scope of the present invention is to add a filter plate with solid opaque rings in the light path to block out a wavelength or a range of wavelengths. This variation may be useful for Raman scattering and luminescence spectrometers that use an intense light that must be filtered out before reaching the detector. Another variation is to use a transmission grating instead of a reflection grating where the detector is on the opposite side of the point source. FIG. 5 shows how a concave mirror can be used to redirect the diffracted rays back through a hole in the ring grating where the detector is positioned. This variation may make the spectrometer more compact and concentrate more of the diffracted light to the detector. It also avoids the chromatic aberration problem associated with lenses.

As described in the present disclosure, many aspects and embodiments of the present invention may include the analysis of one or more samples. In addition, it is contemplated as within the scope of the invention to analyze more than one property or characteristic of a given sample using aspects of the present invention. One example of this is a situation where a sample is being examined for the presence or concentration of two contaminants, contaminant A and contaminant B. It is known that contaminant A and contaminant B each emit a different wavelength of light upon exposure to a particular excitation wavelength of light. In such a case an embodiment of the present invention may include a detector featuring a movable optic system which can focus in on each of the rings generated by contaminant A and contaminant B separately. Additional alternate configurations are contemplated as within the scope of the invention and this example should not be construed as limiting.

Light-ring gratings can be manufactured with standard grating manufacturing techniques including photolithography and machined ruling techniques. Compact Disc (CD) manufacturing techniques can also be used where a master light-ring diffraction grating is used to press grooves into a material like polycarbonate. The ring bands can be similar to band types used with traditional diffraction gratings including equal band width, variable band width, sinusoidal bands or shaped lens-like bands.

Resolution that is adequate for high schools and college labs can be achieved by embodiments of the present invention utilizing a simple computer CD as a light-ring diffraction grating. Even though a CD's circular band spacing is fixed at 1600 nm, it approximates the ideal band spacing shown in FIG. 9 within about 4% over the desired wavelength range. The actual wavelength resolution depends on the size of the spectrometer, the wavelength range and the array detector resolution. FIG. 8 shows an exploded view of a working absorption model with an effective path length of 30 cm between the detector 50 and the diffraction grating 810. The diffraction mechanics underlying by the embodiment of the present invention found in FIG. 8 is similar to that of FIG. 6, including the detection of virtual ring images, rather than real images. Even though the diffracted light from the virtual ring images spreads out with distance, the large circular grating surface area and the short effective path length of 30 cm used in the spectrometer produce surprisingly intense ring spectra. The experimental method is identical to traditional absorption spectrometers. Liquid samples are placed in a cuvette which is inserted in the top of the spectrometer. Initially, a cuvette (not shown) with a clear solvent, like water, may be used to collect a background spectrum. A cuvette holding a sample dissolved in the solvent may then be placed in the spectrometer. A computer program may then collect the images captured by the detector 50 and integrate around the rings as a function of radius. It may then divide the sample and background spectra and display the spectrum for the sample.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. An apparatus comprising:
   a point light source;
   a diffraction grating oriented in a light path generated from said point light source wherein said diffraction grating diffracts and concentrates light from said point light source into one or more rings of light;
   a detector positioned to detect one or more of said rings of light or light transmitted from a sample exposed to said rings of light; and a computer operably connected to said detector to analyze the intensity of one or more of said rings of light or said light transmitted from said sample, wherein said diffraction grating is concave and said diffraction grating corresponds to at least a portion of a Rowland Circle.

2. An apparatus comprising:
   a point light source;
   a diffraction grating oriented in a light path generated from said point light source wherein said diffraction grating diffracts and concentrates light from said point light source into one or more rings of light;
   a detector positioned to detect one or more of said rings of light or light transmitted from a sample exposed to said rings of light; and
a computer operably connected to said detector to analyze the intensity of one or more of said rings of light or said light transmitted from said sample, wherein said diffraction grating is concave and said diffraction grating corresponds to at least a portion of more than one Rowland Circle, and wherein each said Rowland Circle shares a common point intersecting with said point light source and wherein each said Rowland Circle also shares a common point on a common axis.

3. An apparatus comprising:
   a point light source;
   a first diffraction grating oriented in a light path generated from said point light source wherein said first diffraction grating diffracts and concentrates light from said point light source into one or more rings of light;
   a light barrier configured to allow only a portion of light from said rings of light to penetrate said light barrier;
   a sample barrier that does not allow light to pass through that is disposed on the opposite side of a sample from said penetrating light;
   a filter comprising at least one opaque ring, wherein said filter is disposed in a light path emitted from said sample and is disposed off of a common axis and allows light emitted from said sample to substantially pass through;
   a second diffraction grating oriented in a light path emitted from said sample wherein said second diffraction grating diffracts light passing through said filter into one or more rings of emitted light;
   a detector positioned to detect one or more of said rings of emitted light; and
   a computer operably connected to said detector to analyze the intensity of one or more of said emitted rings of light.

4. The apparatus of claim 3, wherein at least one of said first diffraction grating and said second diffraction grating is a reflection diffraction grating.

5. The apparatus of claim 3, wherein at least one of said first diffraction grating and said second diffraction grating is a transmission diffraction grating.

6. The apparatus of claim 3, wherein at least one of said first diffraction grating and said second diffraction grating is concave and corresponds to at least a portion of a Rowland Circle.

7. The apparatus of claim 3, wherein at least one of said first diffraction grating and said second diffraction grating is concave and said concave diffraction grating corresponds to at least a portion of more than one Rowland Circle, and wherein each said Rowland Circle shares a common point intersecting with said point light source and wherein each said Rowland Circle also shares a common point on a common axis.

8. The apparatus of claim 3, wherein at least one of said first diffraction grating and said second diffraction grating comprises a flat ring grating comprising a plurality of variably spaced bands.

9. The apparatus of claim 3, further comprising a lens configured to direct said penetrating light to said sample.

10. The apparatus of claim 3, wherein said point light source is monochromatic.

11. The apparatus of claim 3, wherein said point light source is a light emitting diode.

12. The apparatus of claim 3, wherein said detector contains movable optics.

13. The apparatus of claim 3, wherein said detector is a digital camera.

14. A method of manufacturing an apparatus, the method comprising:
   providing a point light source;
   providing a diffraction grating oriented in a light path from said point light source;
   positioning said diffraction grating such that the light from said point light source is diffracted into one or more rings of light;
   providing a detector;
   positioning said detector such that said detector may detect one or more of said rings of light or light transmitted from a sample exposed to said rings of light; and
   providing a computer;
wherein said computer is operably connected to said detector and said computer analyzes the intensity of one or more of said rings of light, wherein said diffraction grating is concave and said diffraction grating corresponds to at least a portion of a Rowland Circle.

15. A method of manufacturing an apparatus, the method comprising:
   providing a point light source;
   providing a diffraction grating oriented in a light path from said point light source;
   positioning said diffraction grating such that the light from said point light source is diffracted into one or more rings of light;
   providing a detector;
   positioning said detector such that said detector may detect one or more of said rings of light or light transmitted from a sample exposed to said rings of light; and
   providing a computer;
wherein said computer is operably connected to said detector and said computer analyzes the intensity of one or more of said rings of light, wherein said diffraction grating is concave and said diffraction grating corresponds to at least a portion of more than one Rowland Circle, and wherein each said Rowland Circle shares a common point intersecting with said point light source and wherein each said Rowland Circle also shares a common point on a common axis.

* * * * *